(12) United States Patent
Chou et al.

(10) Patent No.: US 8,441,763 B2
(45) Date of Patent: May 14, 2013

(54) MAGNETO-RESISTIVE EFFECT ELEMENT HAVING SPACER LAYER WITH THIN CENTRAL PORTION

(75) Inventors: Tsutomu Chou, Tokyo (JP); Yoshihiro Tsuchiya, Tokyo (JP); Hironobu Matsuzawa, Tokyo (JP); Hayato Koike, Tokyo (JP)

(73) Assignee: TDK Corporation, Tokyo (JP)

( * ) Notice: Subject to any disclaimer, the term of this patent is extended or adjusted under 35 U.S.C. 154(b) by 281 days.

(21) Appl. No.: 13/031,778

(22) Filed: Feb. 22, 2011

(65) Prior Publication Data
US 2012/0214020 A1 Aug. 23, 2012

(51) Int. Cl.
*G11B 5/039* (2006.01)
(52) U.S. Cl.
USPC ........................................ 360/324.1
(58) Field of Classification Search ............ 360/324.1
See application file for complete search history.

(56) References Cited

U.S. PATENT DOCUMENTS

| | | | | |
|---|---|---|---|---|
| 5,646,805 A | * | 7/1997 | Shen et al. | 360/327.1 |
| 5,657,191 A | * | 8/1997 | Yuan | 360/324 |
| 6,396,669 B1 | * | 5/2002 | Gill | 360/319 |
| 2001/0028532 A1 | * | 10/2001 | Egawa et al. | 360/129 |
| 2002/0036876 A1 | * | 3/2002 | Kawawake et al. | 360/324.1 |
| 2005/0190510 A1 | | 9/2005 | Funayama et al. | |
| 2008/0026253 A1 | | 1/2008 | Yuasa et al. | |

* cited by examiner

*Primary Examiner* — Mark Blouin
(74) *Attorney, Agent, or Firm* — Posz Law Group, PLC

(57) ABSTRACT

A magneto-resistive effect (MR) element includes first and second magnetic layers in which a relative angle formed by magnetization directions changes in response to an external magnetic field, and a spacer layer positioned between the first magnetic layer and the second magnetic layer. The spacer layer, on an air bearing surface, has a larger film thickness at both side edge parts in a track width direction than a film thickness at a central part in a track width direction. When a region of the spacer layer on the air bearing surface is divided into quarters which are both side edge part regions and two central regions such that track width direction lengths are equivalent, an average film thickness of a region where the both side edge regions are combined is preferably larger than a region where the two central regions are combined.

12 Claims, 9 Drawing Sheets

⊗ Magnetization Direction: from front side to back side of the sheet
⊙ Magnetization Direction: from back side to front side of the sheet Insulating Layer
Spacer Layer
Cover Layer

MAGNETO-RESISTIVE EFFECT ELEMENT HAVING SPACER LAYER WITH THIN CENTRAL PORTION

BACKGROUND OF THE INVENTION

1. Field of the Invention

The present invention relates to a magneto-resistive effect (MR) element and particularly to a configuration of a spacer layer.

2. Description of the Related Art

Reproducing heads with high sensitivity and high output are in demand in conjunction with condensing of high recording density in hard disk drives (HDD). As an example of this type of reproducing head, a spin valve head has been developed. A spin valve head includes a nonmagnetic metal layer and a pair of ferromagnetic layers positioned on both sides of the nonmagnetic metal layer in a manner of contacting the nonmagnetic metal layer. The magnetization direction of one side of the ferromagnetic layers is pinned in one direction (hereinafter, this type of layer is referred to as a magnetization pinned layer), and the magnetization direction of the other side freely rotates in response to an external magnetic field (hereinafter, this type of layer is referred to as a magnetization free layer). When an external magnetic field is applied, the relative angle of the spins between the magnetization pinned layer and the magnetization free layer changes so that magneto-resistive change is realized. Typically, the magnetization direction of the magnetization pinned layer is pinned by utilizing the exchange coupling force of an anti-ferromagnetic layer.

On the other hand, in order to realize further condensing of high recording density, a reduction of a read gap (a space between upper and lower shield layers) is required. However, when the read gap is reduced to approximately 20 nm, placing an anti-ferromagnetic layer within the read gap becomes difficult. Therefore, a configuration has been developed in which a pair of magnetization free layers is arranged on both sides of a spacer layer. According to this configuration, the reduction of the read gap is easily realized because no anti-ferromagnetic layer is required.

In order to increase a recording density, not only a reduction of the read gap but also an increase in a magnetoresistance ratio (MR ratio) is required. Particularly, it is desirable to realize a large MR ratio when a resistance-area (RA) is around $0.2\ \Omega\mu m^2$. To achieve that, it is effective to enhance a current density by narrowing a cross section of the spacer layer where a current flows. The specification of the U.S. Patent Application Publication No. 2005/0190510 (Patent document 1) discloses a spacer layer including a plurality of circular-truncated-cone-shaped conductors with an axis in a nearly current direction and an insulator disposed therearound. The specification of the U.S. Patent Application Publication No. 2008/0026253 (Patent document 2) discloses a spacer layer in which micropores having a diameter of 50 nm or less are formed on an MgO layer and metal portions are disposed in the micropores. According to these technologies, it is possible to narrow a cross section where a current substantially flows since a sense current mainly flows in a conductive part. The specification of the U.S. Patent Application Publication No. 2002/0036876 (Patent document 3) discloses an MR element with a cross section where a narrowed current flows. The cross section is narrowed by oxidizing, nitriding or oxynitriding side surfaces of a nonmagnetic metal spacer and magnetic layers.

In order to realize high recording density (for example, 1 Tbpsi or more), it is also required to reduce a space between adjacent tracks of a recording medium. To achieve that, it is required to reduce a track direction width of a spacer layer. A requested width in one example is 35 nm or less. When the track direction width of the spacer layer is small, it is difficult to dispose a conductor, which is disclosed in Patent documents 1 and 2, in the spacer layer in terms of manufacture processes. As described in Patent document 3, with a configuration in which a spacer layer and magnetic layers are oxidized, nitrided or oxynitrided, the reduction of the MR ratio is remarkable because of oxidation of the magnetic layers due to oxidation, nitriding or oxynitriding. Particularly, when the track direction width of the spacer layer is small, it is difficult to control a range of oxidizing, nitriding or oxynitriding properly. Therefore, it is difficult to apply these technologies when the track direction width of the spacer layer is small.

It is an object of the present invention to provide an MR element that can realize a large MR ratio by narrowing a cross section where a current flows even when a track direction width of a spacer layer is small.

SUMMARY OF THE INVENTION

A magneto-resistive effect (MR) element includes first and second magnetic layers in which a relative angle formed by magnetization directions changes in response to an external magnetic field, and a spacer layer positioned between the first magnetic layer and the second magnetic layer. The spacer layer, on an air bearing surface, has a larger film thickness at both side edge parts in a track width direction than a film thickness at a central part in a track width direction.

Conventionally, since a spacer layer is formed such that a film thickness is constant and current flowability is the same in any portion of a film surface unless a special configuration such as disposition of a conductive part is applied. On the other hand, in the present invention, a film thickness at the both side edge parts in the track width direction is larger than a film thickness at the track width direction central portion. Therefore, a resistance between both surfaces of the spacer layer becomes larger in a track width direction edge part having the larger film thickness, causing a current to flow in a part having a relatively small film thickness. With such a structure, an effect similar to the effect obtained from the narrowed cross section where a current flows can be substantially obtained. As a result, a current density increases and thereby a large MR ratio can be realized.

The above description, as well as other objects, features, and advantages of the present specification will be evident by the detailed description that follows below with reference to attached drawings illustrating the present specification.

DETAILED DESCRIPTION OF THE INVENTION

An MR element according to embodiments of the present invention and a number of embodiments of a thin film magnetic head including the MR element will be explained utilizing the drawings.

First Embodiment

Figure 1:
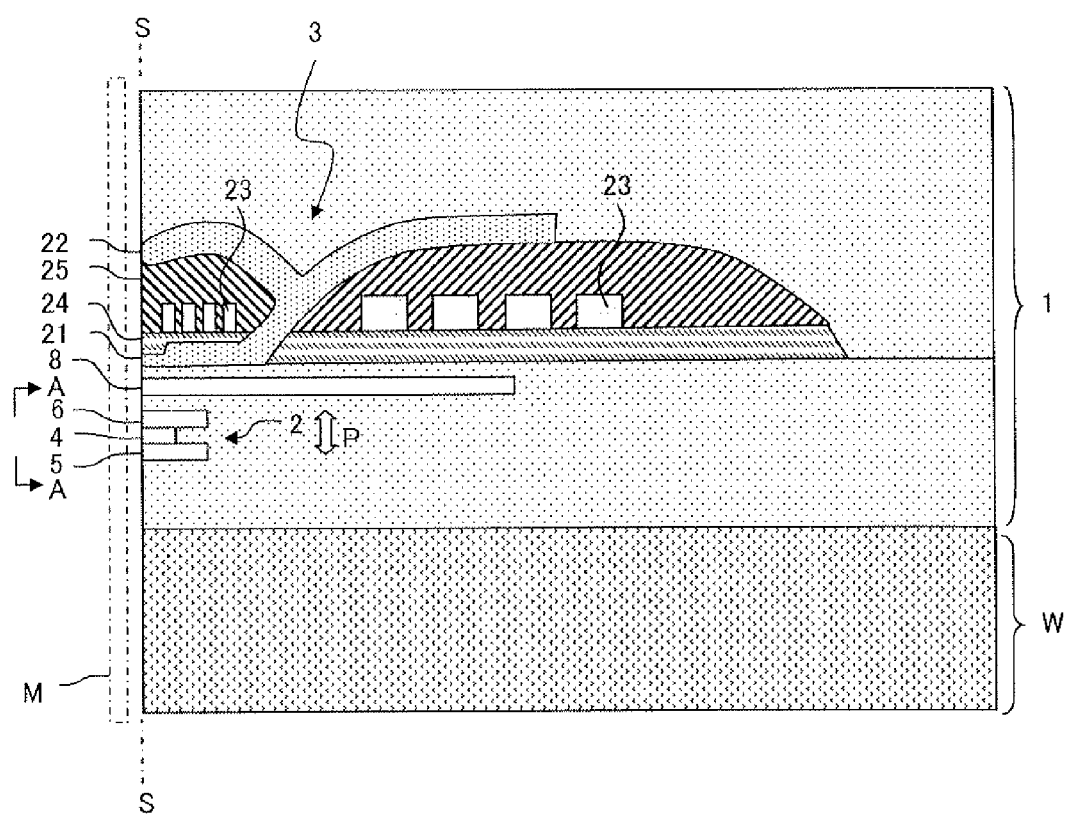
FIG. 1 is a main part cross-sectional view of a thin film magnetic head according to a first embodiment.
Figure 2A:
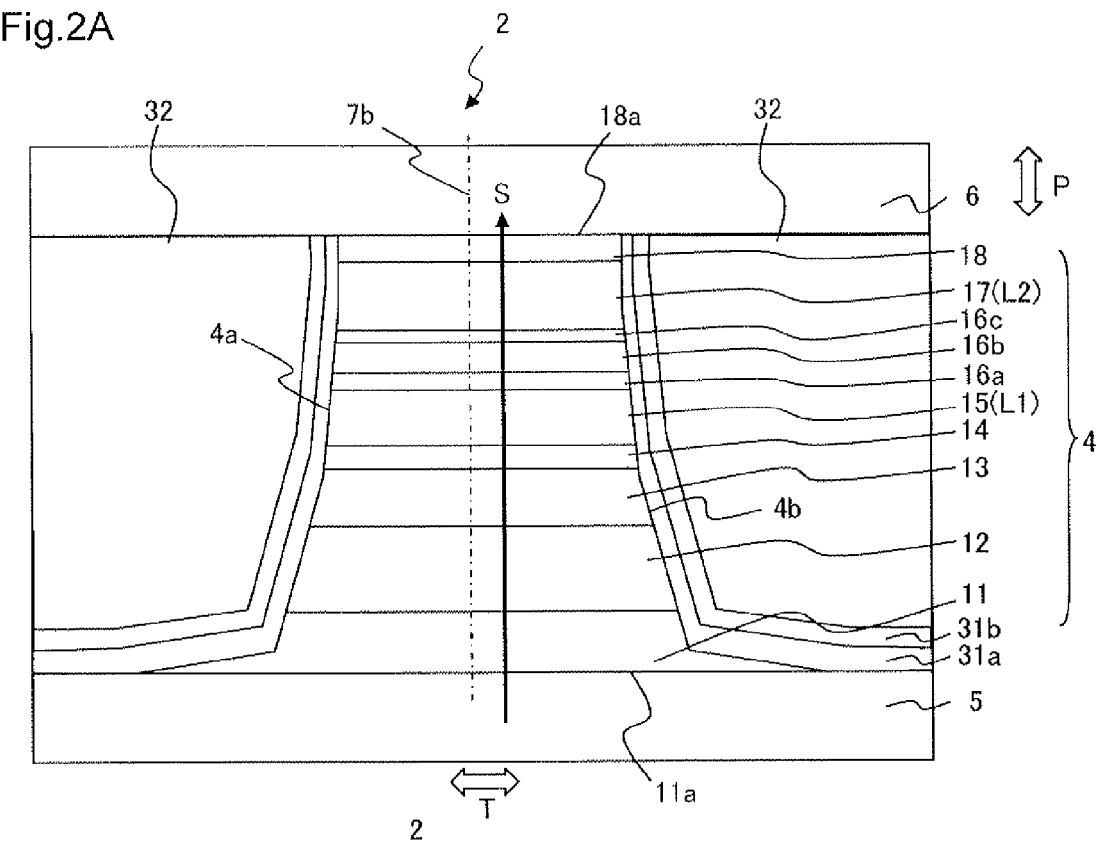
FIGS. 2A and 2B are side views of an MR element illustrated in FIG. 1.
Figure 2B:
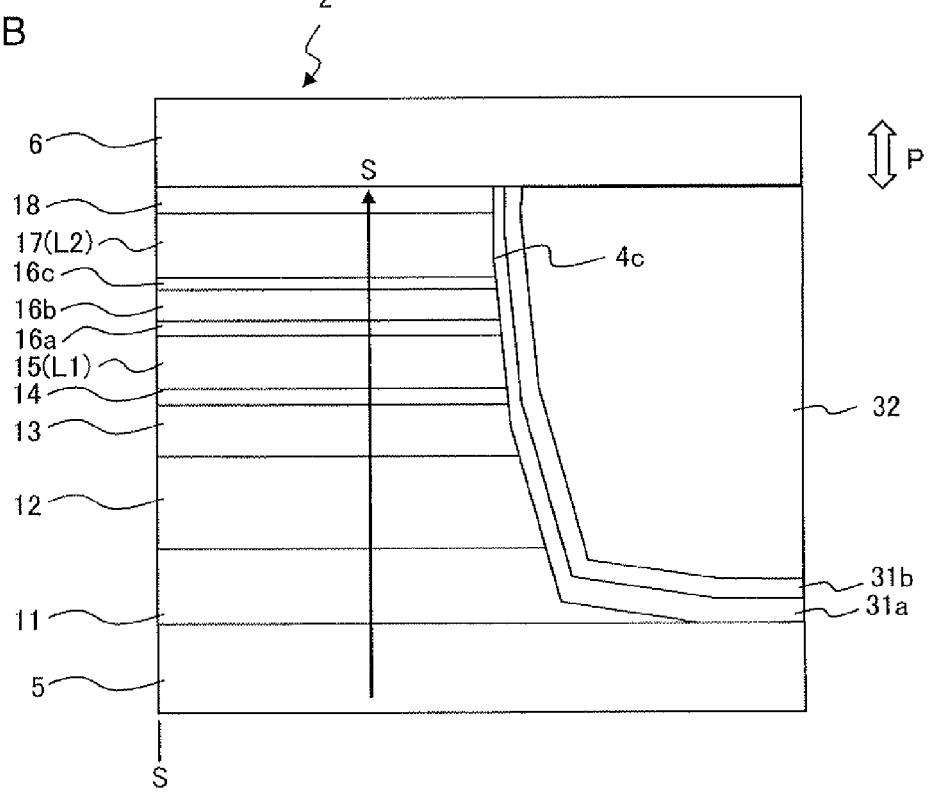

FIG. 1 illustrates a main part cross-sectional view of a thin film magnetic head 1 according to a first embodiment. The thin film magnetic head 1 is formed on a substrate W and includes a reproducing head 2 and a recording head 3. FIG. 2A is a side view of the reproducing head 2, as viewed from the A-A direction of FIG. 1, and illustrates a layer configuration on the air bearing surface S of the reproducing head 2. The air bearing surface S is a surface of the thin film magnetic head 1 that faces a recording medium M. FIG. 2B is a cross-sectional view of the reproducing head 2, as viewed from the same direction as FIG. 1. First, a description will be given regarding the configuration of the reproducing head 2 with reference to these figures.

The reproducing head 2 includes a spin valve type MR element 4, upper and lower shield layers 6 and 5 disposed in a manner of sandwiching the MR element 4 in a film surface orthogonal direction (lamination direction) P, and bias magnetic field application layers 32 disposed on both sides in the track width direction T of the MR element 4 (sheet surface orthogonal direction in FIG. 1). A tip end part of the MR element 4, as illustrated in FIG. 1, is arranged on the air bearing surface S. The MR element 4 is arranged such that a sense current S flows in a film surface orthogonal direction P due to voltage applied between the upper shield layer 6 and the lower shield layer 5. A magnetic field from the recording medium M positioned facing the MR element 4 changes by rotation of the recording medium M. The magnetic field change is detected as an electrical resistance change of a sense current S based on magneto-resistive effect. The MR element 4 reads magnetic information written in the recording medium M utilizing this principle.

Table 1 illustrates one example of a layer configuration of the MR element 4. Table 1 describes the lower shield layer 5 through the upper shield layer 6 from bottom to up in the lamination order.

TABLE 1

| Layer Configuration | | Material | Film Thickness (nm) |
|---|---|---|---|
| Upper Shield Layer 6 | | NiFe | 1000-2000 |
| MR Element 4 | Protective Layer 18 | Ru | 2.0 |
| | Magnetization Free Layer 17 (Second Magnetic Layer L2) | CoFe | 4.0 |
| | Second Nonmagnetic Layer 16c | Zn or Cu | 0.4 |
| | Spacer Layer 16b | GaOx | 0.8 |
| | First Nonmagnetic Layer 16a | Zn or Cu | 0.4 |
| | Inner Magnetization Pinned Layer 15 (First Magnetic Layer L1) | CoFe | 3.5 |
| | Exchange Coupling Transmitting Layer 14 | Ru | 0.8 |
| | Outer Magnetization Pinned Layer 13 | CoFe | 3.0 |
| | Anti-Ferromagnetic Layer 12 | IrMn | 5.0 |
| | Under Layer 11 | NiCr | 4.0 |
| Lower Shield Layer 5 | | NiFe | 1000-2000 |

The MR element 4 has a layer configuration in which the following are laminated above the lower shield layer 5 formed with a NiFe layer in this order: an under layer 11, an anti-ferromagnetic layer 12, an outer magnetization pinned layer 13, an exchange coupling transmitting layer 14, an inner magnetization pinned layer 15 (first magnetic layer L1), a first nonmagnetic layer 16a, a spacer layer 16b, a second nonmagnetic layer 16c, a magnetization free layer 17 (second magnetic layer L2), and a protective layer 18. The protective layer 18 is covered by the upper shield layer 6 formed with a NiFe layer. The MR element 4 has a pillar or trapezoidal shape.

The under layer 11 is disposed in order to obtain a favorable exchange coupling between the outer magnetization pinned layer 13 and the anti-ferromagnetic layer 12 laminated on the under layer 11. The outer magnetization pinned layer 13 is exchange coupled with the anti-ferromagnetic layer 12 composed of IrMn. The outer magnetization pinned layer 13 is exchange coupled with the inner magnetization pinned layer 15 with the exchange coupling transmitting layer 14 composed of Ru therebetween. As a result, the magnetization direction of the inner magnetization pinned layer 15 is firmly pinned. It is desirable that the inner magnetization pinned layer 15 is magnetized in a direction orthogonal to the air bearing surface S within the film plane. The magnetization directions of the inner magnetization pinned layer 15 and the outer magnetization pinned layer 13 are pinned in mutually antiparallel orientations, and thus the overall magnetization of a portion where these are combined are suppressed. The magnetization free layer 17 in which the magnetization direction changes according to an external magnetic field is disposed above the inner magnetization pinned layer 15 with the spacer layer 16b sandwiched therebetween. The protective layer 18 is disposed to prevent a deterioration of each laminated layer. The outer and inner magnetization pinned layers 13 and 15 as well as the magnetization free layer 17 are typically composed of CoFe; however, may also contain Ni.

The bias magnetic field application layers 32 are formed on both sides in the track width direction T of the MR element 4 with a cover layer 31a and an insulating layer 31b therebetween. The bias magnetic field application layers 32 are a magnetic domain control film that changes the magnetization free layer 17 to a single magnetic domain, and applies a bias magnetic field to the magnetization free layer 17 in the track width direction T. The bias magnetic field application layers 32 are formed of CoPt, CoCrPt, or the like. The cover layer 31a is composed of $Al_2O_3$, $SiO_2$, gallium oxide or the like as a primary component. The insulating film 31b is composed of $Al_2O_3$, $SiO_2$, or the like. The cover layer 31a may contain additives other than $Al_2O_3$, $SiO_2$, or gallium oxide. The additives are, for example, metal oxides. Also, the mole fraction of $Al_2O_3$, $SiO_2$, or gallium oxide contained in the cover layer 31a is preferably 50% or more. The cover layer 31a and the insulating film 31b cover side surfaces 4a, 4b and 4c of the MR element 4 with exception of the air bearing surface S. When the cover layer 31a is formed of a substance having high insulation property such as $Al_2O_3$, $SiO_2$ and the like, the insulating film 31*b* may not be formed.

A sense current S flows in the MR element 4 in the film surface orthogonal direction P. The sense current S is supplied from the upper and lower shield layers 6 and 5 which also function as electrodes. The magnetization direction of the magnetization free layer 17 is controlled in the track width direction T, i.e., in an orientation orthogonal to the magnetization direction of the inner magnetization pinned layer 15, by the bias magnetic field from the bias magnetic field application layers 32 when no external magnetic field is applied. When an external magnetic field from the recording medium M is applied to the magnetization free layer 17, the magnetization direction of the magnetization free layer 17 rotates by a predefined angle in a predefined direction within the film plane according to a direction and strength of the external magnetic field. The magnetization direction of the magnetization free layer 17 forms a relative angle with the magnetization direction of the inner magnetization pinned layer 15 according to a direction and strength of an external magnetic field, and a spin dependent scattering of conductive electrons changes according to the relative angle, thereby a magneto-resistive change is generated. The MR element 4 detects this magneto-resistive change and reads magnetic information of the recording medium M.

The position of the magnetization free layer 17 and the outer and inner magnetization pinned layers 13 and 15 may be reversed vertically with respect to the spacer layer 16*b*. That is to say, the magnetization free layer 17 may be positioned closer to the substrate W than the outer and inner magnetization pinned layers 13 and 15. Specifically, each of the layers from the inner magnetization pinned layer 15 to the anti-ferromagnetic layer 12 is arranged between the protective layer 18 and the second nonmagnetic layer 16*c* (arranged such that the inner magnetization pinned layer 15 is at the bottommost side and the anti-ferromagnetic layer 12 is at the top-most side), and the magnetization free layer 17 is arranged between the under layer 11 and the first nonmagnetic layer 16*a*.

In the present specification, in terms of the magnetization free layer 17 and the inner magnetization pinned layer 15, the layer positioned closer to the substrate W above which the MR element 4 is formed, i.e., beneath the spacer layer 16*b* as viewed in the lamination direction, is referred to as the first magnetic layer L1, and the layer positioned farther from the first magnetic layer L1 as viewed from the substrate W, i.e., above the spacer layer 16*b* as viewed in the lamination direction, is referred to as the second magnetic layer L2. In the layer configuration illustrated in Table 1, the inner magnetization pinned layer 15 is the first magnetic layer L1 and the magnetization free layer 17 is the second magnetic layer L2. In the layer configuration with the reversed positional relation, the magnetization free layer 17 is the first magnetic layer L1 and the inner magnetization pinned layer 15 is the second magnetic layer L2.

In the present embodiment, the spacer layer 16*b* is formed of an oxide. For one example, the spacer layer 16*b* is composed of gallium oxide as a primary component. The composition of gallium oxide is expressed by the general formula GaOx where the range of x is $1.45 \leq x \leq 1.55$. Gallium oxide is normally formed in an amorphous state. In another embodiment, the spacer layer 16*b* may be composed of magnesium oxide or zinc oxide as a primary component. The spacer layer 16*b* may contain additives other than the oxide of gallium, oxide of magnesium or oxide of zinc. The additives are, for example, metal oxides. Also, the mole fraction of gallium oxide, magnesium oxide or zinc oxide in the spacer layer 16*b* is preferably 50% or more. Gallium oxide, magnesium oxide or zinc oxide has a larger resistance value as well as a larger resistance change compared to Cu used in a conventional spacer layer. Therefore, a larger MR ratio may be obtained compared to the conventional MR element in which Cu is used as a spacer layer.

Gallium oxide, magnesium oxide and zinc oxide are promising materials for realizing a high MR ratio. However, since they contain oxygen, when the first and second magnetic layers L1 and L2 are adjacent to the spacer layer 16*b*, elements such as Fe, Co, Ni and the like contained in the first and second magnetic layers L1 and L2, and particularly Fe, have a tendency to be oxidized. When these elements are oxidized, there is a tendency for the MR ratio to fall.

Therefore, for the purpose of avoiding direct contact between the spacer layer 16*b* and the first magnetic layer L1 to effectively prevent oxidation of the first magnetic layer L1, the first nonmagnetic layer 16*a* composed of copper or zinc as a primary component is disposed between the first magnetic layer L1 and the spacer layer 16*b*. The first nonmagnetic layer 16*a* is positioned contacting both the first magnetic layer L1 and the spacer layer 16*b*. The first nonmagnetic layer 16*a* is preferably composed of substantially copper or zinc, and may contain a few amounts of additives. The first nonmagnetic layer 16*a* may be partially oxidized. Namely, the first nonmagnetic layer 16*a* may be substantially composed of copper or zinc, and oxygen.

For the same purpose, the second nonmagnetic layer 16*c* composed of copper or zinc as a primary component is disposed between the second magnetic layer L2 and the spacer layer 16*b*. The spacer layer 16*b* includes the second nonmagnetic layer 16*c* that is composed of copper or zinc and is positioned between the spacer layer 16*b* and the second magnetic layer L2 in contact with both. The second nonmagnetic layer 16*c* can prevent oxidation of the second magnetic layer L2. The second nonmagnetic layer 16*c* is preferably composed of substantially copper or zinc, and may contain a few amounts of additives. The second nonmagnetic layer 16*c* may be partially oxidized. Namely, the second nonmagnetic layer 16*c* may be substantially composed of copper or zinc, and oxygen.

Figure 3A:
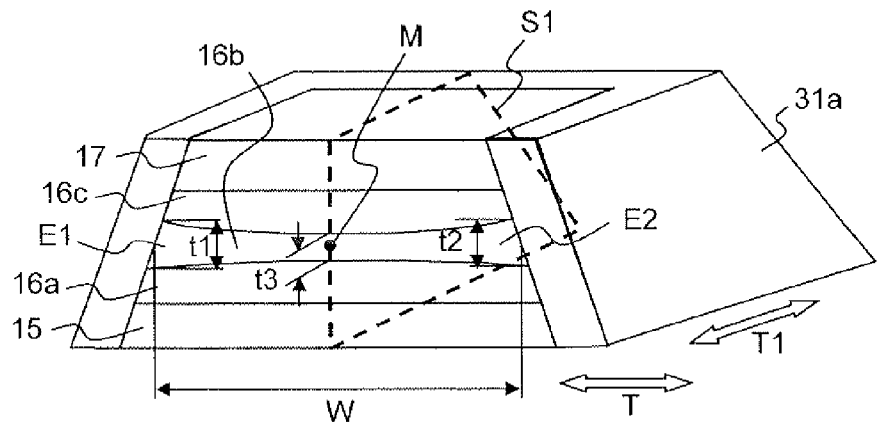
FIGS. 3A-3D are views illustrating a spacer layer in detail.

Further detailed description regarding a configuration of the spacer layer 16*b* will be given. FIG. 3A is a partially enlarged view of the vicinity of the spacer layer. Regarding the spacer layer 16*b*, on the air bearing surface S, film thicknesses t1 and t2 at both side edge parts E1 and E2 in the track width direction T is larger than a film thickness t3 at a track width direction central part M. In one example, the spacer layer 16*b*, on the air bearing surface S, has a nearly constant thickness near the center in the track width direction T and has a thicker thickness toward the both side edge parts E1 and E2. In the case of a spacer layer having a width of 35 nm or less, a width of a central portion where a thickness is nearly constant is half of a width W of the spacer layer 16*b* or less.

Figure 3B:
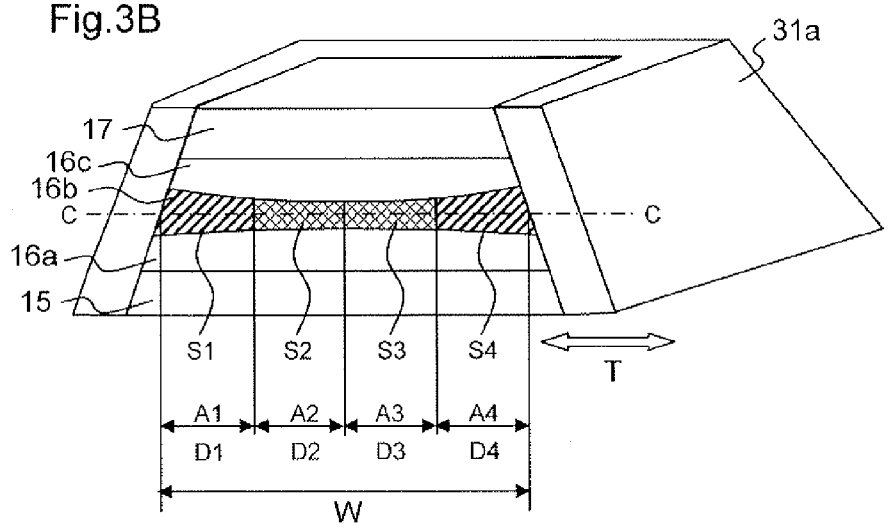

As illustrated in FIG. 3B, a region of the spacer layer 16*b* on the air bearing surface is divided into quarters in the track width direction T along a central axis C-C passing through a center of film thickness of the spacer layer 16*b*. The quarters are both side edge part regions A1 and A4 and two central regions A2 and A3. The quarters indicate that track width direction lengths D1~D4 of the regions A1~A4 are the same. In the present embodiment, an average film thickness of a region A1+A4 where the both side edge part regions A1 and A4 are combined is larger than an average film thickness of a region A2+A3 where the central regions A2 and A3 are combined.

Figure 3C:
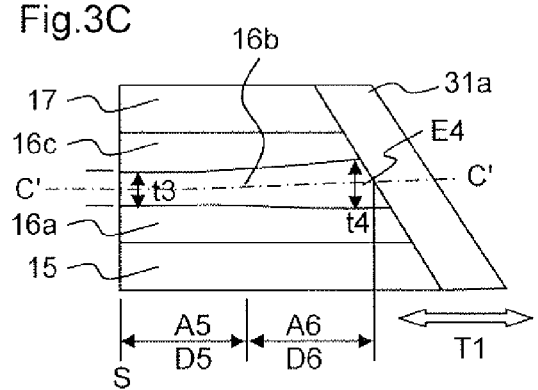

FIG. 3C is a partially enlarged view of the vicinity of the spacer layer cut along a cross section (a portion illustrated by the broken line in FIG. 3A) orthogonal to the air bearing surface S and passing through the track width direction central part M of the spacer layer. Regarding the spacer layer 16b on a cross section S1 orthogonal to the air bearing surface S and passing through the track width direction central part M, a film thickness t4 at an edge part E4 on the opposite side of the air bearing surface S is larger than the film thickness t3 on the air bearing surface S. In one example, the spacer layer 16b, in a direction T1 orthogonal to the track width direction, has a nearly constant thickness on the air bearing surface S and its vicinity and has a thicker thickness toward an edge part E4 on the opposite side as viewed from the air bearing surface S. In the present embodiment, when the spacer layer 16b is divided along a part where a central line C'-C' along the center of film thickness is divided into two equal parts into a half part A5 on an air bearing surface side and a half part A6 on the opposite side from the air bearing surface, an average film thickness of the half part A6 is larger than an average film thickness of the half part A5. The two equal parts indicate that lengths D5 and D6 in the direction T1 orthogonal to the track width direction of the regions A5 and A6 are the same.

Figure 3D:
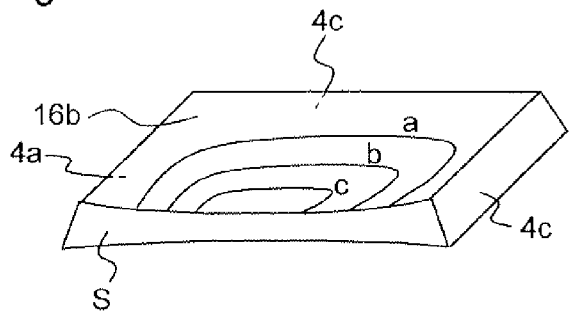

In other words, the center of the air bearing surface S and its vicinity region of the spacer layer 16b is the thinnest and the vicinities of three side surfaces 4a, 4b and 4c excluding the air bearing surface S of the spacer layer 16b are the thickest (see FIG. 3D). FIG. 3D is a perspective view that illustrates only the extracted spacer layer 16b, and curved lines a, b and c in the figure illustrate an example of contours.

Since a portion where a film thickness is thin has a low resistance value in the film thickness direction, a sense current flows preferentially in the portion where the film thickness is thin. As a result, a current density of the sense current becomes the largest on the air bearing surface S and its vicinity and becomes the smallest in the vicinity of the three side surfaces 4a, 4b and 4c. Therefore, an effect similar to the effect when a cross section where a sense current flows is narrowed can be obtained. In a region where a current density of a sense current is high, an MR ratio increases because spin information of conductive electrons is more easily saved. Not only when the spacer layer is composed of a metal oxide having a high resistance value as a primary component, the above-described effect can be normally obtained not depending on materials configuring the spacer layer. Therefore, the present invention is not limited by materials of the spacer layer. For example, an MR element using a conventional spacer layer composed of Cu is also included in the range of the present invention as long as the spacer layer has the above-described shape.

Next, a method for manufacturing the above-described MR element will be explained. First, the lower shield layer 5 is formed above the substrate W by a plating method with the insulating layer therebetween as needed. Next, layers configuring the MR element 4 are formed by a sputtering. Specifically, after a film forming chamber containing a target and the substrate W is depressurized to be a high vacuum atmosphere, inert gas such as argon is introduced into the film forming chamber. When ionized inert gas collides with the target, fine particles are ejected from the target and are deposited on the lower shield layer 5, and thereby a multilayer film is formed.

Next, a previously formed multilayer film is formed in a trapezoidal or pillar shape. Specifically, a resist is formed partially on the multilayer film, and the multilayer film excluding the portion covered by the resist is removed by ion milling. The remained multilayer film has a pillar or trapezoidal shape. After that, the resist is removed.

Next, the side surfaces of the multilayer film formed in the pillar or trapezoidal shape are covered by the cover layer 31a composed of gallium oxide as a primary component. A sputtering method is used for forming the cover layer 31a as well as forming the multilayer film; however, an ion beam deposition (IBD) method may be also used.

After that, the insulating layer 31b is formed on the cover layer 31a, the bias magnetic field application layers 32 are formed on both sides in the track width direction as illustrated in FIGS. 2A and 2B, and the upper shield layer 6 is formed on the MR element 4 and the bias magnetic field application layers 32.

The spacer layer 16b is formed such that a thickness becomes the thickest on the side surfaces of the multilayer films formed in the pillar or trapezoidal shape by ion milling and in the film formation process of the cover layer 31a thereafter. Reasons why such a solid shape is formed is not identified; however, the inventor considers it is due to a stress generated during the multilayer film formation. It is considered that, depending on a formation condition of the cover layer when the cover layer is formed (refilled) after the ion milling, expansion of the side surfaces of the spacer layer 16b (gallium oxide film) occurs due to the stress. This phenomenon is also observed when a spacer layer is formed of magnesium oxide or zinc oxide. As will be described below, a film thickness ratio between a periphery part and a center part can be controlled when a film formation condition of the cover layer and particularly film formation power (power added to a target during the film formation) are selected properly and a film formation rate is adjusted. In other words, by setting a specific condition as a film formation condition of the cover layer, the spacer layer 16b can be formed such that the film thicknesses of the side surfaces are larger than the central portion. Note that one side surface of the multilayer film formed in a pillar or trapezoidal shape becomes an air bearing surface S by being lapped in a following process. Therefore, after the lapping, the center of the air bearing surface S and its vicinity region of the spacer layer 16b become the thinnest and the vicinity of three side surfaces 4a, 4b and 4c with exception of the air bearing surface S of the spacer layer 16b become the thickest.

Referencing FIG. 1 again, the recording head 3 is disposed above the reproducing head 2 with an interelement shield layer 8 formed therebetween by the sputtering method or the like. The recording head 3 has a configuration for so-called perpendicular magnetic recording. A magnetic pole layer for writing is composed of a main magnetic pole layer 21 and an auxiliary magnetic pole layer 22. These magnetic pole layers are formed by a frame plating method or the like. The main magnetic pole layer 21 is formed of FeCo and is arranged in an orientation nearly orthogonal to the air bearing surface S on the air bearing surface S. A coil layer 23 extending over a gap layer 24 composed of an insulating material is wound around the periphery of the main magnetic pole layer 21 so that a magnetic flux is induced to the main magnetic pole layer 21 by the coil layer 23. The coil layer 23 is formed by a frame plating method or the like. The magnetic flux is guided within the main magnetic pole layer 21 and is emitted from the air bearing surface S towards the recording medium M. The main magnetic pole layer 21 is tapered not only in the film surface orthogonal direction P but also in the track width direction T near the air bearing surface S so as to generate a minute and strong write magnetic field in accordance with the high recording density.

The auxiliary magnetic pole layer 22 is a magnetic layer magnetically coupled with the main magnetic pole layer 21. The auxiliary magnetic pole layer 22 is a magnetic pole layer with a film thickness between approximately 0.01 μm and approximately 0.5 μm and is formed of an alloy composed of two or three of any of Ni, Fe, Co or the like. The auxiliary magnetic pole layer 22 is disposed in a manner that branches from the main magnetic pole layer 21 and faces the main magnetic pole layer 21 with the gap layer 24 and a coil insulating layer 25 therebetween on the air bearing surface S side. The edge part of the auxiliary magnetic pole layer 22 on the air bearing surface S side forms a trailing shield part in which a layer cross-section is wider than other parts of the auxiliary magnetic pole layer 22. A magnetic field gradient between the auxiliary magnetic pole layer 22 and the main magnetic pole layer 21 becomes steeper in the vicinity of the air bearing surface S when this type of auxiliary magnetic pole layer 22 is provided. As a result, a signal output jitter is reduced, and an error rate during reading can be lowered.

Second Embodiment

Figure 4A:
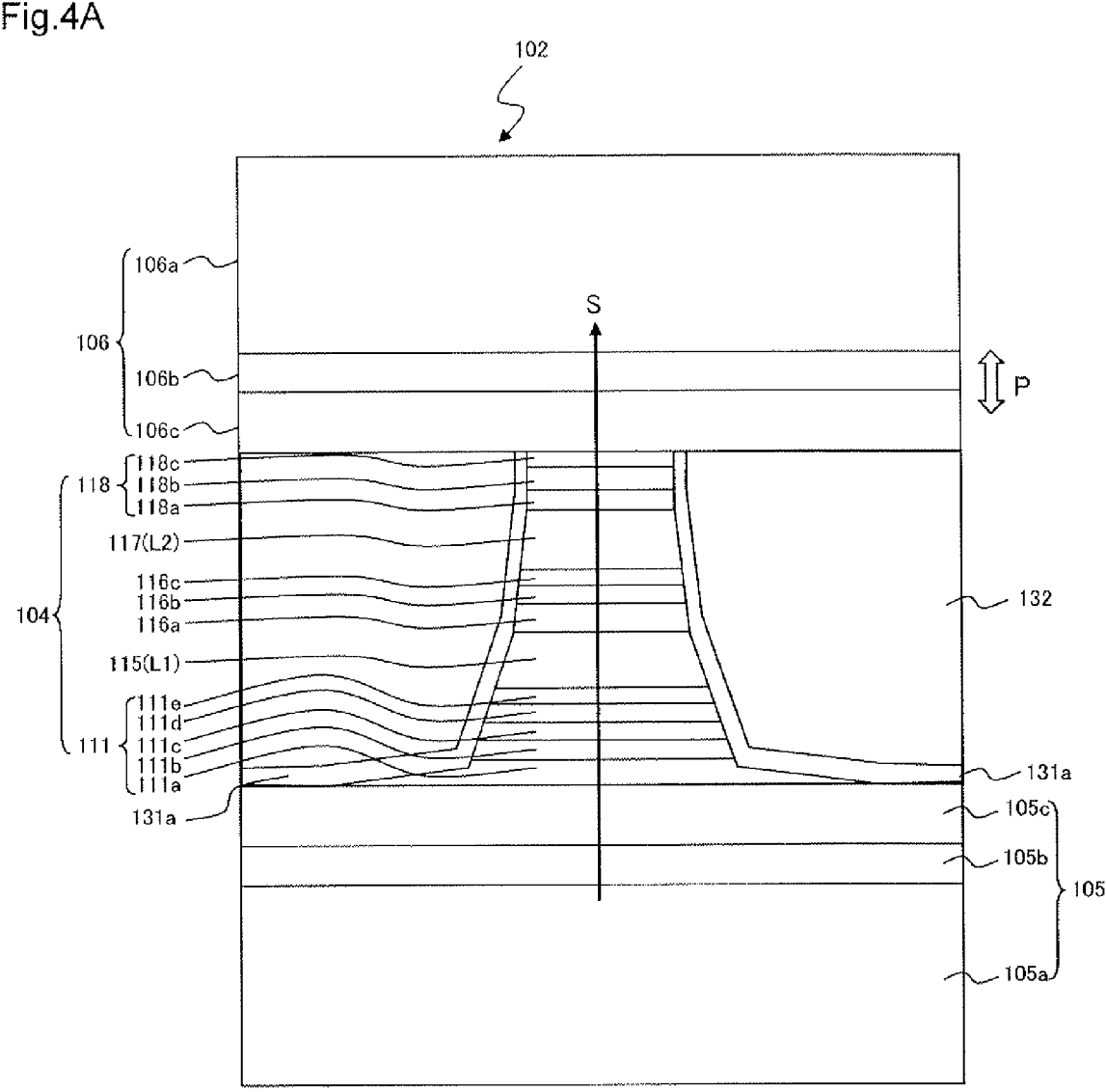
FIGS. 4A and 4B are side views of an MR element according to a second embodiment.

A thin film magnetic head 1 of the present embodiment is the same as the first embodiment illustrated in FIG. 1 with the exception of the configuration of the reproducing head 2. FIG. 4 and Table 2 illustrate a layer configuration of such an MR element. A reproducing head 102 includes an MR element 104 and upper and lower shield layers 106 and 105. The MR element 104 has a large number of layers laminated in the same manner as the first embodiment. The upper and lower shield layers 106 and 105 are disposed so as to sandwich the MR element 104 in the film surface orthogonal direction P (lamination direction). The upper and lower shield layers 106 and 105 are also used as electrodes for a sense current S to cause the sense current S to flow in the film surface orthogonal direction P of the MR element 104.

With the present embodiment, a first magnetic layer L1 and a second magnetic layer L2 are magnetization free layers 115 and 117 in both of which the magnetization direction changes in response to the external magnetic field. A bias magnetic field application layer 132 is disposed on the backside of the MR element 104 as viewed from the air bearing surface S with a cover layer 131 a therebetween and applies a bias magnetic field to the first and second magnetization free layers 115 and 117 (first and second magnetic layers L1 and L2) in a direction orthogonal to the air bearing surface S. A first nonmagnetic layer 116a, a spacer layer 116b and a second nonmagnetic layer 116c are disposed between the first and second magnetization free layers 115 and 117. A first magnetic linkage layer 111 is disposed between the first magnetization free layer 115 and the lower shield layer 105, and a second magnetic linkage layer 118 is disposed between the second magnetization free layer 117 and the upper shield layer 106.

TABLE 2

| | Film Configuration | | Material | Film Thickness (nm) |
|---|---|---|---|---|
| Upper Shield Layer 106 | Second Main Shield Layer 106a | | NiFe | 1000-2000 |
| | Second Anti-Ferromagnetic Layer 106b | | IrMn | 6.0 |
| | Second Exchange Coupling Magnetic Field Application Layer 106c | | CoFe | 1.5 |
| | | | NiFe | 20 |
| MR Element 104 | Second Magnetic Linkage Layer 118 | Exchange Coupling Transmitting Layer 118c | Ru | 0.8 |
| | | Gap Adjustment Layer 118b | CoFe | 1.0 |
| | | Exchange Coupling Transmitting Layer 118a | Ru | 0.8 |
| | Second Magnetization Free Layer 117 (Second Magnetic Layer L2) | | CoFe | 3.0 |

TABLE 2-continued

| | Film Configuration | | Material | Film Thickness (nm) |
|---|---|---|---|---|
| | Second Nonmagnetic Layer 116c | | Zn or Cu | 0.4 |
| | Spacer Layer 116b | | GaOx | 0.8 |
| | First Nonmagnetic Layer 116a | | Zn or Cu | 0.4 |
| | First Magnetization Free Layer 115 (First Magnetic Layer L1) | | CoFe | 3.0 |
| | First Magnetic Linkage Layer 111 | Exchange Coupling Transmitting Layer 111e | Ru | 0.8 |
| | | Gap Adjustment Layer 111d | CoFe | 1.0 |
| | | Exchange Coupling Transmitting Layer 111c | Ru | 0.8 |
| | | Gap Adjustment Layer 111b | CoFe | 1.0 |
| | | Exchange Coupling Transmitting Layer 111a | Ru | 0.8 |
| Lower Shield Layer 105 | First Exchange Coupling Magnetic Field Application Layer 105c | | NiFe | 20 |
| | | | CoFe | 1.5 |
| | First Anti-Ferromagnetic Layer 105b | | IrMn | 6.0 |
| | First Main Shield Layer 105a | | NiFe | 1000-2000 |

The lower shield layer 105 includes a first main shield layer 105a, and a first anti-ferromagnetic layer 105b and a first exchange coupling magnetic field application layer 105c laminated above the first main shield layer 105a. The magnetization direction of the first exchange coupling magnetic field application layer 105c is pinned in the track width direction T due to anti-ferromagnetic coupling with the first anti-ferromagnetic layer 105b. Similarly, the upper shield layer 106 includes a second main shield layer 106a, and a second anti-ferromagnetic layer 106b and a second exchange coupling magnetic field application layer 106c laminated below the second main shield layer 106a. The magnetization direction of the second exchange coupling magnetic field application layer 106c is pinned in the track width direction T due to anti-ferromagnetic coupling with the second anti-ferromagnetic layer 106b. The first and second exchange coupling magnetic field application layers 105c and 106c are magnetized mutually in the same direction. In other embodiments, instead of disposing the first and second anti-ferromagnetic layers 105b and 106b and the first and second exchange coupling magnetic field application layers 105c and 106c, the magnetization directions of the first and second main shield layers 105a and 106a may be oriented in the same direction by forming the first and second main shield layers 105a and 106a in a long and narrow shape in the track width direction T and forming a single magnetic domain using a shape anisotropic effect.

Figure 4B:
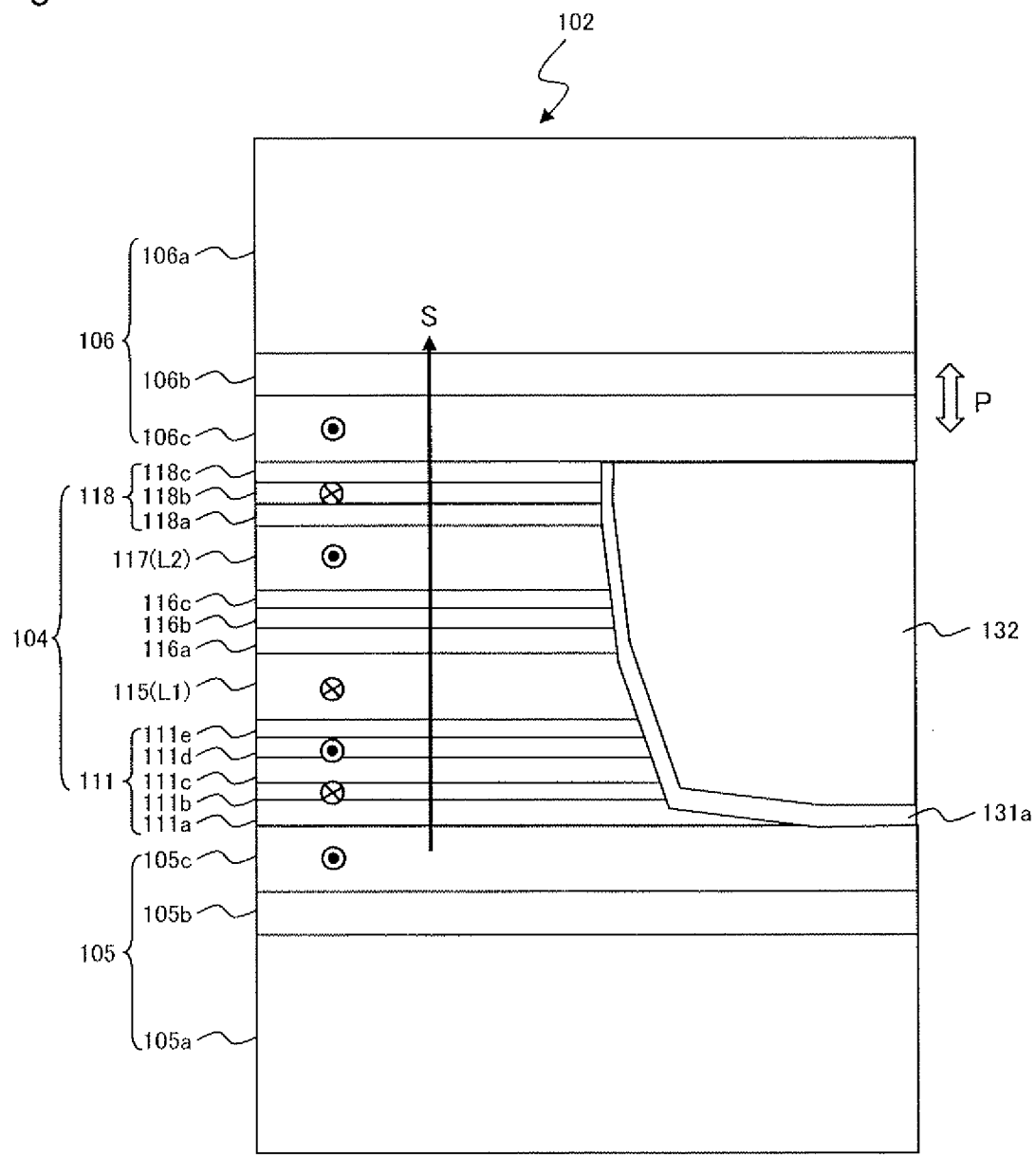

The first magnetic linkage layer 111 has a structure in which gap adjustment layers 111b and 111d composed of CoFe are alternated and respectively laminated with exchange coupling transmitting layers 111a, 111c and 111e composed of Ru, and the exchange coupling transmitting layers 111a and 111e are positioned at both side edge surfaces. The second magnetic linkage layer 118, in the same manner as the first magnetic linkage layer 111, also has a structure in which a gap adjustment layer 118b composed of CoFe is alternated and laminated with exchange coupling transmitting layers 118a and 118c composed of Ru, and the exchange coupling transmitting layers 118a and 118c are positioned at both side edge surfaces. A pair of magnetic layers 105c and 111b, a pair of magnetic layers 111b and 111d, and a pair of magnetic layers 111d and 115 that respectively sandwich the exchange coupling transmitting layers 111a, 111c, and 111e perform exchange coupling. A pair of magnetic layers 106c and 118b and a pair of magnetic layers 118b and 117 that respectively sandwich the exchange coupling transmitting layers 118a and 118c perform exchange coupling. As illustrated in FIG. 4B, the magnetization directions alternately reverse (no bias magnetic field is applied).

The total film thickness of the MR element 104 can be adjusted to match a shield gap by adjusting the film thickness of the gap adjustment layers 111b, 111d and 118b. The smaller the shield gap is, the more beneficial it is to realize high recording density; however, the shield gap may also be determined according to the required film thickness of the bias magnetic field application layer 132. In this case, it is preferred to adjust the total film thickness, i.e., the shield gap, of the MR element 104 by changing the film thickness of the gap adjustment layers 111b, 111d and 118b.

In the second embodiment, an insulating film such as the insulating film 31b of the first embodiment is not disposed; however, as in the first embodiment, the cover layer 131a may be covered by an insulating film composed of $Al_2O_3$, $SiO_2$ or the like.

Figure 5:
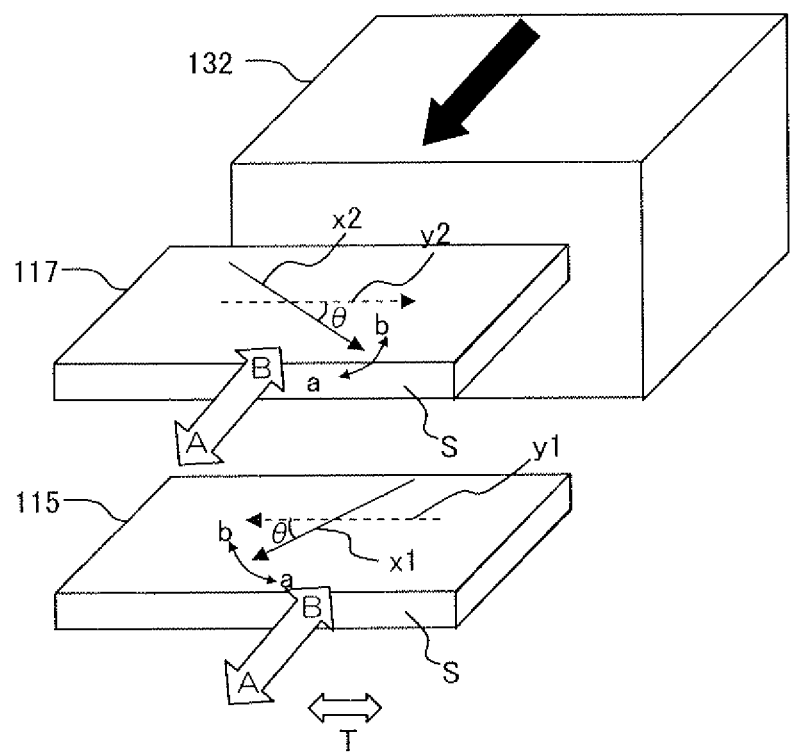
FIG. 5 is a schematic view illustrating a principle of performance of the MR element according to the second embodiment.

The above-described MR element 104 performs as will be described hereinafter. A virtual condition will be considered first in which there is no bias magnetic field application layer 132. FIG. 5 is a schematic view illustrating the magnetizations of the first and second magnetization free layers 115 and 117. The magnetization directions of the first and second exchange coupling magnetic field application layers 105c and 106c are transmitted to the first and second magnetization free layers 115 and 117 while reversed by the gap adjustment layers 111b, 111d and 118b with the exchange coupling transmitting layers 111a, 111c, 111e, 118a and 118c therebetween. Therefore, the first magnetization free layer 115 is magnetized in the track width direction T toward an orientation y1 that is anti-parallel to the magnetization direction of the first exchange coupling magnetic field application layer 105c. The second magnetization free layer 117 is magnetized in the track width direction T toward an orientation y2 that is the same as the magnetization direction of the second exchange coupling magnetic field application layer 106c.

Next, a condition will be considered in which a bias magnetic field is applied. The bias magnetic field rotates the magnetization directions of the first and second magnetization free layers 115 and 117 oriented in the track width direction T toward a direction orthogonal to the air bearing surface S. As illustrated by the solid line arrows x1 and x2 of FIG. 5, the magnetization directions rotate by a prescribed angle θ in mutually opposite directions from the broken line arrows y1 and y2, and ideally are mutually orthogonal. This is the magnetization state of the first and second magnetization free layers 115 and 117 when no external magnetic field is applied.

When an external magnetic field is applied in this state as illustrated by the outline arrows in the drawing, the magnetization directions of the first and second magnetization free layers 115 and 117 rotate in mutually opposite directions according to the orientation of the external magnetic field. When the external magnetic field is applied in the direction A in the drawing, the magnetization directions (solid line arrows x1 and x2) of the first and second magnetization free layers 115 and 117 rotate in the direction (a) in the drawing, and when the external magnetic field is applied in the direction B in the drawing, the magnetization directions of the first and second magnetization free layers 115 and 117 rotate in the direction (b) in the drawing. In this manner, a relative angle formed by magnetization directions of the first and second magnetization free layers 115 and 117 changes according to the external magnetic field, and the resistance value for the sense current S varies based on the magneto-resistive effect. Utilizing this principle, the MR element 104 can detect the orientation and strength of the external magnetic field.

In this manner, the MR element 104 of the present embodiment includes a pair of magnetization free layers 115 and 117 in which the magnetization direction changes according to the external magnetic field, and the spacer layer 116b sandwiched by these layers. The MR element 104 differs from the first embodiment with regards to the point that the magnetization directions of the pair of magnetization free layers 115 and 117 rotate mutually according to the external magnetic field; however, the same configuration as for the spacer layer 16b in the first embodiment can be applied to the spacer layer 116b. Similarly, the same configuration as the first nonmagnetic layer 16a and the second nonmagnetic layer 16c can be used for the first nonmagnetic layer 116a and the second nonmagnetic layer 116c.

The magnetization directions of the first and second magnetization free layers 115 and 117 can be reversed by adjusting a total number of Ru layers and gap adjustment layers included in the first and second magnetic linkage layers 111 and 118. For example, when the magnetization directions of the upper shield layer 106 and the lower shield layer 105 are anti-parallel, as illustrated in Table 3, the magnetization direction of the first magnetization free layer 115 can be reversed by configuring the first magnetic linkage layer 111 with two Ru layers 111a and 111c and a single gap adjustment layer 111b inserted therebetween. In the same manner, a similar effect can be obtained with the configuration indicated in Table 2, although not illustrated in the drawing, by configuring the second magnetic linkage layer 118 as a five layer configuration that is similar to the first magnetic linkage layer 111.

TABLE 3

| | Film Configuration | | Material | Film Thickness (nm) |
|---|---|---|---|---|
| Upper Shield Layer 106 | Second Main Shield Layer 106a | | NiFe | 1000-2000 |
| | Second Anti-Ferromagnetic Layer 106b | | IrMn | 6.0 |
| | Second Exchange Coupling Magnetic Field Application Layer 106c | | CoFe | 1.5 |
| | | | NiFe | 20 |
| MR Element 104 | Second Magnetic Linkage Layer 118 | Exchange Coupling Transmitting Layer 118c | Ru | 0.8 |
| | | Gap Adjustment Layer 118b | CoFe | 1.0 |
| | | Exchange Coupling Transmitting Layer 118a | Ru | 0.8 |
| | Second Magnetization Free Layer 117 (Second Magnetic Layer L2) | | CoFe | 3.0 |
| | Second Nonmagnetic Layer 116c | | Zn or Cu | 0.4 |
| | Spacer Layer 116b | | GaOx | 0.8 |
| | First Nonmagnetic Layer 116a | | Zn or Cu | 0.4 |
| | First Magnetization Free Layer 115 (First Magnetic Layer L1) | | CoFe | 3.0 |
| | First Magnetic Linkage Layer 111 | Exchange Coupling Transmitting Layer 111c | Ru | 0.8 |
| | | Gap Adjustment Layer 111b | CoFe | 1.0 |
| | | Exchange Coupling Transmitting Layer 111a | Ru | 0.8 |
| Lower Shield Layer 105 | First Exchange Coupling Magnetic Field Application Layer 105c | | NiFe | 20 |
| | | | CoFe | 1.5 |
| | First Anti-Ferromagnetic Layer 105b | | IrMn | 6.0 |
| | First Main Shield Layer 105a | | NiFe | 1000-2000 |

EXAMPLE

An MR film with the layer configuration illustrated in Table 2 was formed above a substrate W composed of Al$_2$O$_3$—TiC (ALTIC) by using a sputtering device. The thickness of the spacer layer (Gallium oxide layer) at the track width direction central part M on the air bearing surface was 0.8 nm. After depressing a film formation chamber pressure to a vacuum atmosphere having 10$^{-6}$ Pa or less, Ar gas was introduced into the film formation chamber and each of the layers was formed under a sputtering pressure of approximately 0.1 Pa. The spacer layer composed of gallium oxide was formed by a radio frequency (RF) sputtering method, and the other films were formed by a direct current (DC) magnetron sputtering method. After each of the layers was formed and heat treatment (annealing) was performed for three hours at 250° C., a multilayer film was processed by an ion milling (Ar ion milling, a chamber pressure: approximately 1.0×1.0$^5$ Pa, milling rate: 0.1 nm/sec). After that, film shaped gallium oxide was formed as a cover layer at a sputtering pressure of approximately 0.1 Pa by the RF sputtering method. A junction size of the processed MR element was 0.2 μm×0.2 μm. When no external magnetic field is applied, the directions of the first and second magnetization free layers are mutually and orthogonally oriented; however, when an external magnetic field is applied, the directions freely rotate and the magnetoresistive effect is generated.

Similarly, an MR element was manufactured by the same process using a spacer layer composed of magnesium oxide or zinc oxide with the film configuration illustrated in Table 2 as a substitute of the spacer layer composed of gallium oxide. The thickness of the magnesium oxide layer at the track width direction central part M on the air bearing surface was 0.8 nm, and the thickness of the zinc oxide layer at the track width direction central part M on the air bearing surface was 1.6 nm. The widths of the three types of manufactured spacer layer in the track width direction were approximately 35 nm.

For each of the three types of spacer layer, four types of sample each having different shaped spacer layer were manufactured by controlling film formation power of an ion-milled cover layer (gallium oxide). As a result, as illustrated in Table 4, twelve types of samples in total were manufactured. Film formation power of each case is illustrated in the table.

TABLE 4

| Sample | Spacer layer | Area ratio (Film thickness ratio) | Film formation power (W) | Normalized MR ratio |
| --- | --- | --- | --- | --- |
| 1-1 | GaOx | 1.00 | 40 | 1 |
| 1-2 | GaOx | 1.02 | 60 | 1.04 |
| 1-3 | GaOx | 1.05 | 80 | 1.14 |
| 1-4 | GaOx | 1.20 | 100 | 1.27 |
| 2-1 | MgO | 1.00 | 40 | 1 |
| 2-2 | MgO | 1.02 | 60 | 1.05 |
| 2-3 | MgO | 1.04 | 80 | 1.15 |
| 2-4 | MgO | 1.18 | 100 | 1.26 |
| 3-1 | ZnO | 1.00 | 40 | 1 |
| 3-2 | ZnO | 1.02 | 60 | 1.04 |
| 3-3 | ZnO | 1.06 | 80 | 1.13 |
| 3-4 | ZnO | 1.21 | 100 | 1.25 |

Herein, as illustrated in FIG. 3B, areas of regions A1-A4 were designated as S1-S4, and a ratio (S1+S4)/(S2+S3) of a total area S2+S3 of the central regions A2 and A3 to a total area S1+S4 of both side edge part regions A1 and A4 was set as an area ratio. Since track width direction lengths D1~D4 of the regions A1~A4 are equivalent, the area ratio is substantially the same as a ratio of average film thickness.

For respective cases of gallium oxide, magnesium oxide and zinc oxide, normalized MR ratios were determined based on MR ratios (1-1, 2-1 and 3-1) when the thicknesses of the spacer layers were nearly equivalent. The MR ratios tend to increase as the area ratio (film thickness ratio) increases. When the area ratio (film thickness ratio) is larger than approximately 5% (more specifically, 5% in the case of gallium oxide, 4% in the case of magnesium oxide, and 6% in the case of zinc oxide), the normalized MR ratio was obviously increased.

Figure 6A:
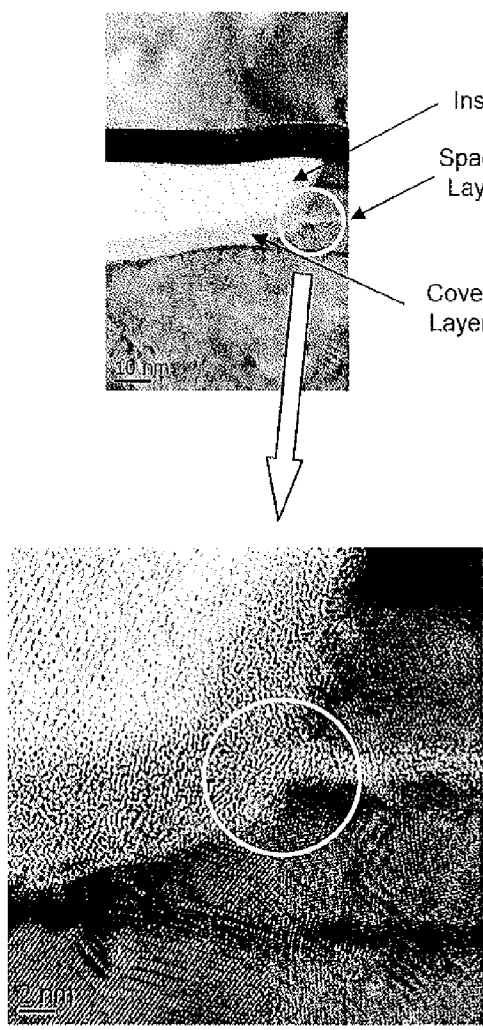
FIGS. 6A and 6B are pictures of edge parts of the spacer layer.
Figure 6B:
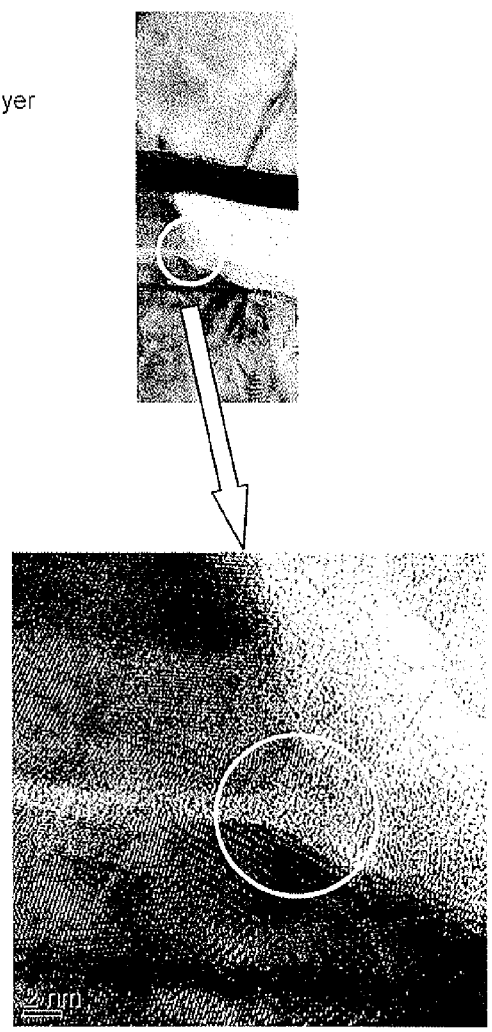

FIG. 6A shows a picture with an enlarged view of the track width direction edge part of the spacer layer manufactured based on a condition of the above-described samples 1-4. In fact, it was confirmed that a film thickness of the spacer layer was increased near the edge parts. FIG. 6B is a same picture of another example, and the same phenomenon was confirmed.

Figure 7:
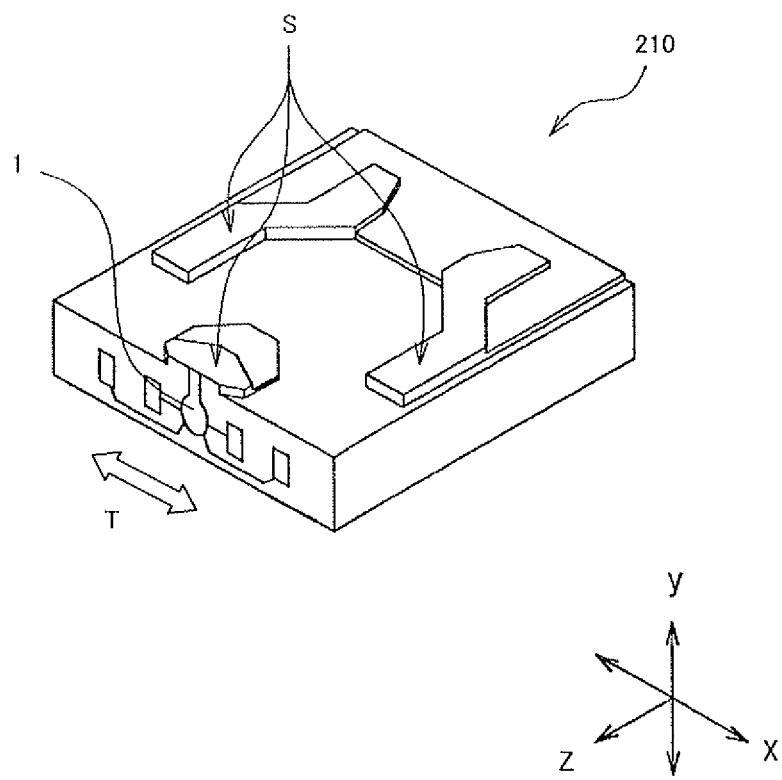
FIG. 7 is a perspective view of a magnetic head slider of the present invention.

Next, a description regarding a magnetic head slider on which the thin film magnetic head 1 is mounted will be given. Referring to FIG. 7, a magnetic head slider 210 has a substantially hexahedral shape, and one surface of the six outer surfaces is the recording air bearing surface S that faces a hard disk. The magnetic head slider 210 is arranged in the hard disk drive device so as to face the hard disk, which is a disk-shaped recording medium M that is rotatably driven. When the hard disk rotates in the z-direction of FIG. 8, air flow passing between the hard disk and the magnetic head slider 210 generates a downward lifting force in the y-direction to the magnetic head slider 210. The magnetic head slider 210 flies above the surface of the hard disk due to the lifting force. In the vicinity of the edge part of the magnetic head slider 210 (edge part in bottom left of FIG. 5) on the air flow exit side, the thin film magnetic head 1 is formed.

Figure 8:
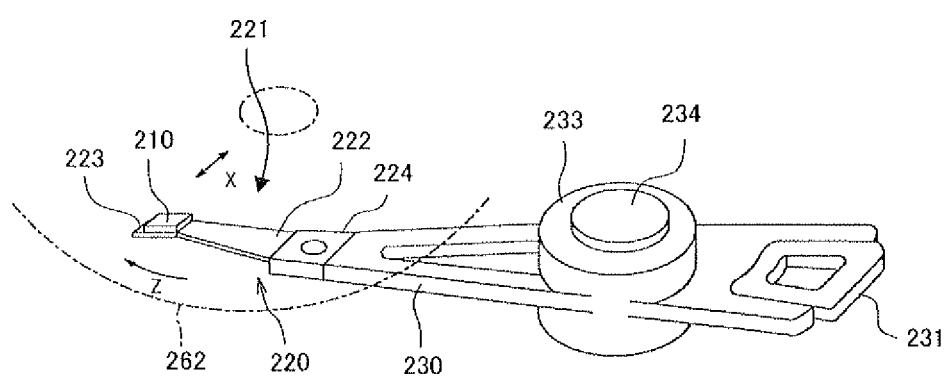
FIG. 8 is a perspective view of a head arm assembly of the present invention.

Referring to FIG. 8, a head gimbal assembly 220 includes the magnetic head slider 210 and a suspension 221 elastically supporting the magnetic head slider 210. The suspension 221 includes a load beam 222, a flexure 223 and a base plate 224. The load beam 222 is formed of stainless steel in a plate spring shape. The flexure 223 is arranged in one edge part of the load beam 222. The base plate 224 is arranged in the other edge part of the load beam 222. The magnetic head slider 210 is joined to the flexure 223 to give the magnetic head slider 210 suitable flexibility. At the part of the flexure 223 to which the magnetic head slider 210 is attached, a gimbal part is disposed to maintain the magnetic head slider 210 in an appropriate orientation.

An assembly in which the head gimbal assembly 220 is mounted to an arm 230 is referred to as a head arm assembly 221. The arm 230 moves the magnetic head slider 210 in a track crossing direction x of a hard disk 262. One edge of the arm 230 is attached to the base plate 224. To the other edge of the arm 230, a coil 231 that forms one part of a voice coil motor is attached. A bearing part 233 is disposed in the middle part of the arm 230. The arm 230 is rotatably supported by a shaft 234 attached to the bearing part 233. The arm 230 and the voice coil motor for driving the arm 230 configure an actuator.

Figure 9:
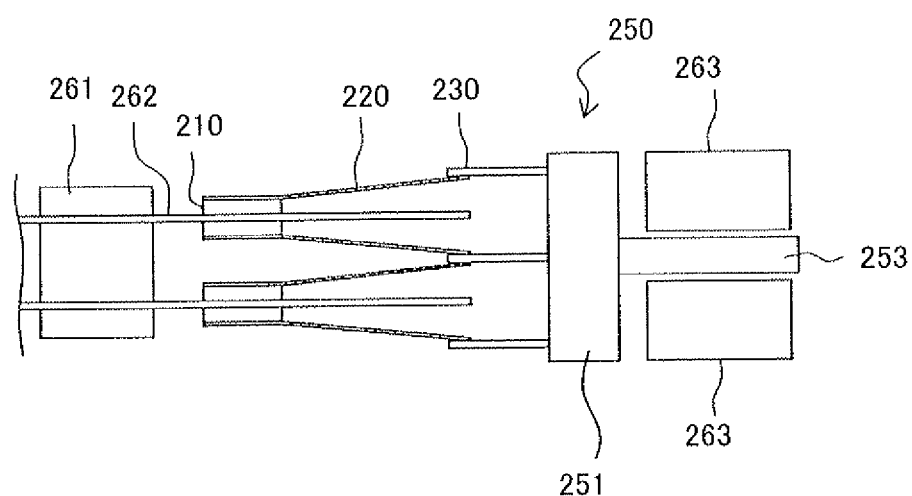
FIG. 9 is a side view of a head stack assembly of the present invention.
Figure 10:
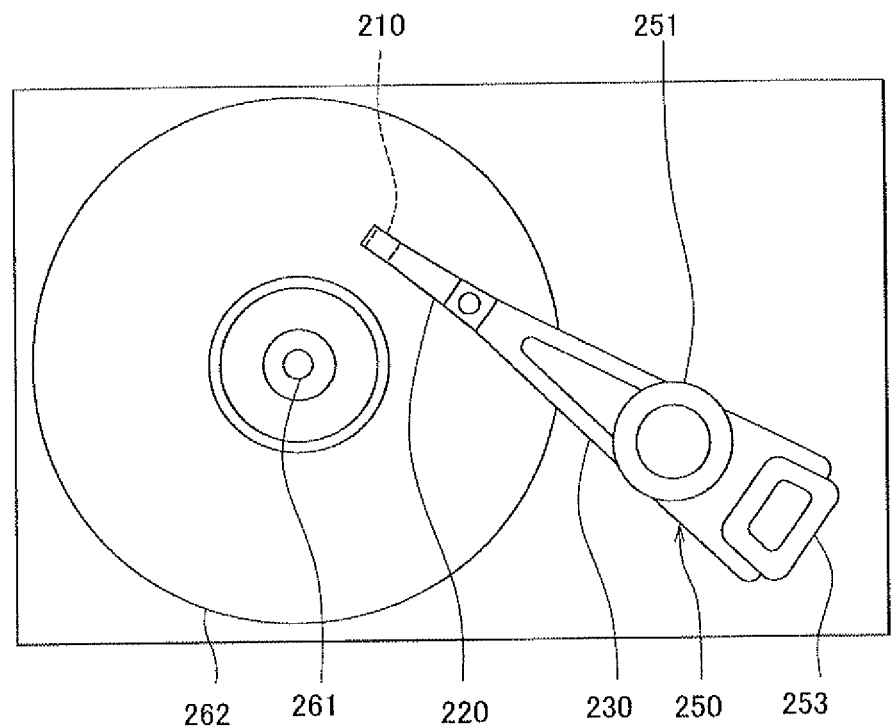
FIG. 10 is a plan view of a hard disk drive device of the present invention.

Next, referring to FIGS. 9 and 10, the description will be given with regard to a head stack assembly in which the above-described magnetic head slider is integrated, and the hard disk drive device. The head stack assembly is an assembly in which the head gimbal assembly 220 is attached to each arm of a carriage including a plurality of the arms. FIG. 9 is a side view of the head stack assembly, and FIG. 10 is a plan view of the hard disk drive device. The head stack assembly 250 includes a carriage 251 including a plurality of arms 230. On each of the arms 230, the head gimbal assembly 220 is attached so that the head gimbal assemblies 220 align mutually at an interval in the vertical direction. On the side of the carriage 251, which is the backside to the arm 230, a coil 253 is mounted to be a part of the voice coil motor. The voice coil motor includes permanent magnets 263 arranged so as to sandwich the coil 253 and to face each other.

Referring to FIG. 9, the head stack assembly 250 is integrated in the hard disk drive device. The hard disk drive device includes multiple hard disks 262 attached to a spindle motor 261. For each of the hard disks 262, two magnetic head sliders 210 are arranged in a manner of sandwiching the hard disk 262 and facing each other. The head stack assembly 250 except for the magnetic head slider 210 and the actuator position the magnetic head slider 210 with respect to the hard disk 262 in correspondence with a positioning device as well as supports the magnetic head slider 210. The magnetic head slider 210 is moved in the track crossing direction of the hard disk 262 by the actuator, and is positioned with respect to the hard disk 262. The thin film magnetic head 11 included in the magnetic head slider 210 records information to the hard disk 262 with the recording head 3, and reproduces information recorded on the hard disk 262 with the reproducing heads 2 and 102.

While preferred embodiments of the present invention have been shown and described in detail, and it is to be understood that variety of changes and modifications may be made without departing from the spirit of scope of the following claims or its scope.

What is claimed is:

1. A magneto-resistive effect (MR) element, comprising:
    first and second magnetic layers in which a relative angle formed by magnetization directions changes in response to an external magnetic field; and
    a spacer layer positioned between the first magnetic layer and the second magnetic layer, wherein
    the spacer layer, on an air bearing surface, has a larger film thickness at both side edge parts in a track width direction than a film thickness at a central part in a track width direction.

2. The MR element according to claim 1, wherein
    when a region of the spacer layer on the air bearing surface is divided into quarters which are both side edge part regions and two central regions such that track width direction lengths are equivalent, an average film thickness of a region where the both side edge part regions are combined is larger than a region where the two central regions are combined.

3. The MR element according to claim 2, wherein
    the average film thickness of the region where the both side edge part regions are combined is 5% or more larger than the average film thickness of the region where the two central regions are combined.

4. The MR element according to claim 1, wherein,
    on a cross section passing through the central part in the track width direction and orthogonal to the air bearing surface, the spacer layer has a larger average film thickness in a half part on an opposite side of the air bearing surface than an average film thickness in a half part on the air bearing surface side.

5. The MR element according to claim 1, wherein
    the spacer layer is composed of gallium oxide, magnesium oxide or zinc oxide as a primary component.

6. The MR element according to claim 5, further comprising:
    a layer composed of copper or zinc as a primary component between at least either one of the first magnetic layer or the second magnetic layer and the spacer layer.

7. A magnetic head including the MR element according to claim 1.

8. The magnetic head according to claim 7, wherein
    one of the first magnetic layer and the second magnetic layer is a magnetization free layer in which a magnetization direction changes in response to the external magnetic field, and the other is a magnetization pinned layer in which a magnetization direction is pinned, and
    the magnetic head further comprises a pair of bias magnetic field application layers that is disposed on both sides of the MR element in a track width direction and that applies a bias magnetic field in the track width direction to the magnetization free layer.

9. The magnetic head according to claim 7, wherein
    both the first magnetic layer and the second magnetic layer are magnetization free layers in which magnetization directions change in response to the external magnetic field, and
    the magnetic head further comprises a bias magnetic field application layer that is disposed on a backside of the MR element as viewed from the air bearing surface and that applies a bias magnetic field in a direction orthogonal to the air bearing surface to the first and second magnetic layers.

10. A magnetic head slider including the magnetic head according to claim 7.

11. A head gimbal assembly including the magnetic head according to claim 7.

12. A hard disk drive device including the magnetic head according to claim 7.

* * * * *